United States Patent
Albornoz et al.

(10) Patent No.: US 7,636,883 B2
(45) Date of Patent: Dec. 22, 2009

(54) USER FORM BASED AUTOMATED AND GUIDED DATA COLLECTION

(75) Inventors: Jordi A. Albornoz, Arlington, MA (US); Lee Feigenbaum, Brookline, MA (US); Sean J. Martin, Boston, MA (US); Simon L. Martin, Hursley (GB); Lonnie A. McCullough, Houston, TX (US); Madhusmita Mitra, Tarrytown, NY (US); Elias Torres, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 11/131,535

(22) Filed: May 18, 2005

(65) Prior Publication Data

US 2006/0265640 A1 Nov. 23, 2006

(51) Int. Cl.
*G06F 17/28* (2006.01)
(52) U.S. Cl. .................... 715/231; 715/233; 715/234
(58) Field of Classification Search ................ 715/221, 715/224, 226, 230, 231, 233
See application file for complete search history.

(56) References Cited

U.S. PATENT DOCUMENTS

| 5,652,876 | A | * | 7/1997 | Ashe et al. ............... 703/26 |
| 5,999,182 | A | | 12/1999 | Etchemendy et al. |
| 6,081,829 | A | * | 6/2000 | Sidana ................. 709/203 |
| 6,484,156 | B1 | | 11/2002 | Gupta et al. |
| 6,519,603 | B1 | | 2/2003 | Bays et al. |
| 6,571,295 | B1 | * | 5/2003 | Sidana ................. 709/246 |
| 6,956,593 | B1 | | 10/2005 | Gupta et al. |
| 6,996,558 | B2 | | 2/2006 | Dettinger et al. |
| 7,251,777 | B1 | * | 7/2007 | Valtchev et al. ........... 715/234 |
| 7,392,267 | B2 | | 6/2008 | Cragun et al. |
| 7,472,341 | B2 | | 12/2008 | Albornoz et al. |
| 2001/0042098 | A1 | * | 11/2001 | Gupta et al. ............. 709/206 |
| 2002/0073157 | A1 | * | 6/2002 | Newman et al. .......... 709/206 |
| 2003/0018632 | A1 | * | 1/2003 | Bays et al. ............... 707/3 |
| 2003/0145281 | A1 | * | 7/2003 | Thames et al. ........... 715/513 |
| 2003/0145282 | A1 | * | 7/2003 | Thomas et al. .......... 715/513 |
| 2003/0167358 | A1 | * | 9/2003 | Marvin et al. ........... 709/328 |
| 2003/0191770 | A1 | * | 10/2003 | Nudi et al. .............. 707/101 |
| 2003/0196164 | A1 | | 10/2003 | Gupta et al. |
| 2004/0138946 | A1 | | 7/2004 | Stolze |
| 2004/0150669 | A1 | | 8/2004 | Sabiers et al. |

(Continued)

OTHER PUBLICATIONS

Title: "Electrical Schematics Page", http://www.jlab.org/accel/inj_group/elec1.htm, Author: Jefferson Lab, Publication Date: Jul. 10, 1997 last modified Apr. 25, 2002, Page: 1 page.

(Continued)

*Primary Examiner*—Stephen S Hong
*Assistant Examiner*—Gregory J Vaughn
(74) *Attorney, Agent, or Firm*—John E. Campbell (57) ABSTRACT

In response to a user request, an annotation form is presented to a user for annotating a target document or image in a database. The annotation form is associated with the target document. A runtime program is associated with the annotation form. The annotation form selected by the user provides prompts for annotation input. The annotation input is saved in an annotation database and the runtime program performs an action on behalf of the user. Preferably the runtime program action comprises analysis of elements of the target document.

20 Claims, 8 Drawing Sheets

U.S. PATENT DOCUMENTS

| | | |
|---|---|---|
| 2004/0163042 A1 | 8/2004 | Altman |
| 2004/0189713 A1* | 9/2004 | Thames et al. .............. 345/810 |
| 2004/0215497 A1* | 10/2004 | Leist ............................. 705/8 |
| 2004/0215498 A1* | 10/2004 | Leist ............................. 705/8 |
| 2004/0215499 A1* | 10/2004 | Leist ............................. 705/8 |
| 2004/0215535 A1* | 10/2004 | Leist ........................... 705/34 |
| 2004/0226030 A1* | 11/2004 | Marvin et al. ............... 719/328 |
| 2004/0260702 A1* | 12/2004 | Cragun et al. ............... 707/100 |
| 2004/0260714 A1* | 12/2004 | Chatterjee et al. ........... 707/101 |
| 2004/0260717 A1* | 12/2004 | Albornoz et al. ............ 707/102 |
| 2004/0267798 A1* | 12/2004 | Chatterjee et al. ........... 707/102 |
| 2005/0125716 A1* | 6/2005 | Cragun et al. ............... 715/512 |
| 2005/0210038 A1* | 9/2005 | Dettinger et al. ............ 707/100 |
| 2006/0101328 A1* | 5/2006 | Albornoz et al. ............ 715/512 |
| 2006/0129905 A1* | 6/2006 | Spork .......................... 715/500 |

OTHER PUBLICATIONS

Title: "Effective Abstractions in Multimedia Layout, Presentation, and Interaction", Date: Nov. 4, 1995, San Francisco, CA, http://www.cs.uic.edu/~ifc/mmwsproc/mmws.html—Title: "Improvise—a process modeling interface with multimedia graph diagrams", Authors: Naser Barghouti and Stephen North, AT&T Bell Labs, USA, Pages: 17 pages.

* cited by examiner

USER FORM BASED AUTOMATED AND GUIDED DATA COLLECTION

FIELD OF THE INVENTION

The present invention is related to annotating documents in computer systems, more particularly to providing GUI Forms for guiding annotation of viewable images.

BACKGROUND OF THE INVENTION

Annotation is the process of adding metadata to some target data. Annotation systems allow users to record insights or notes about any target data for the benefit of future users who view or use the target data. The target data (document) can be any form of data including for example text data, image data, bitmap data, audio data, video data and the like. Annotation systems use computers to simulate the paradigm of 'sticky-notes' or 'margin notes' that people often use when working with paper documents. People record their judgments and observations about the paper document by marking on the document itself. Thus, when another reader looks at the document, the note is immediately apparent to the reader. Computer Annotation Systems exist to apply this paradigm to electronic target data and documents. Electronic "sticky notes" are annotations applied preferably to a location of the document. Such annotation systems have other advantages as well. Many annotation systems allow for querying the library of annotations and target data as a way to find important judgments or important target documents. Other systems even allow for annotations to perform a workflow task, such as in the system described by Ser. No. 10/983,820 "Multi-User Multi-Timed Collaborative Annotations" Filed Nov. 8, 2004. Many annotation systems also provide the capability of automated annotations, that is, annotations made without user input, usually by batch processes. Annotation systems are in high demand in life sciences industries but are not limited to that domain.

The main problem with current annotation systems is the burden placed on users to create annotations. Users often see annotating a document as having no immediate benefit to the task they are accomplishing. They are often annotating for the vague ideal that it will help another user in the future. While automated annotations remove the user from the process, such annotations are not always appropriate as human insights are often beneficial or required when creating annotations. Annotations also often serve as a tool for adding order to existing freeform data as well and bringing out important data from freeform data. By annotating, the user is often placing the important aspects of some target data into a more structured and queryable form. However users often see such annotation tasks as a bother. The main problems in many annotation systems are often not technical problems but simply that users fail to annotate effectively and thus the usefulness of the annotation system suffers. Thus there is room for improvement upon current annotation systems to make creating annotations have immediate reward for the user and to eliminate annotation tasks that users consider rote, boring, or burdensome.

SUMMARY OF THE INVENTION

The present invention provides predetermined annotation forms to a user. The forms assist the user in creating consistent annotations to a document. The form provides a consistent set of GUI prompts and fields such that the user is directed to providing the required data consistently. Furthermore, the invention associates a runtime program associated with the form for performing tasks automatically. For example the runtime may run an analysis tool that analyses the document to be annotated for the user. The runtime may also enter data automatically into the form including user information, document to be annotated information, results of runtime initiated queries and the like. Thus, with the present invention, a user selected portion of a user selected document to be annotated can be selected for annotating. A list of forms available to the users is presented to the user. The user selects a desired form which selection causes portions of the form to be filled in, a runtime action is performed, and user provided annotation information is prompted. The annotation data obtained using the form is saved in an annotation store along with information associating the location in a document store of the associated document annotated preferably with location information locating a portion of the document related to the annotation.

In an embodiment, an annotation application receives a user request for an annotation form for annotating a target document. Responsive to the user request, an annotation form is selected according to one or more predetermined parameters, the annotation form preferably comprising one or more text prompts for annotation data. The first annotation form is associated with the location of the target document. A runtime program is associated with the annotation form, the runtime program having access to any one of user GUI, annotation data, the target document, external data or external processes. A GUI representation of the first annotation form is presented to the user. A user GUI annotation input is received according a text prompts. The received GUI annotation input is associated with the annotation form. Responsive to a user GUI input, annotations associated with the annotation form are saved in an annotation database. Furthermore an action associated with the use of the annotation form is performed by way of the runtime program.

It is therefore an object of the invention to provide a predetermined annotation form for guiding a user in creating an annotation.

It is an object of the invention to associate a runtime program with the annotation form such that an action can be performed automatically to assist the user in performing the annotation.

It is another object of the invention to create an annotation of a document to be annotated based on criteria presented to a user by way of a predetermined form selected from a group of one or more forms.

It is another object of the invention is to perform an action step by receiving a GUI action initiator from the user; and initiating the performance of the action step responsive to the received GUI action initiator.

It is another object of the invention to automatically initiate an action step when a user performs any one of presenting an annotation form or saving an annotation form.

It is still another object of the invention to perform an action by any one of analyzing elements of a target document or providing results of an analysis of elements of the target document to the user.

In yet another object of the invention to automatically fill in a field of an annotation form based results of a runtime task initiated by the determining step, other annotation fields, the target document being annotated, program context or program environment.

It is still another object of the invention to present a GUI representation of an annotation form by automatically presenting any one of a multi-part form, a field, a widget, a prompt or a color in the annotation form based on results of a runtime task initiated by the determining step, other annotation fields, the target document being annotated, program context or program environment.

It is an object of the invention to guide a user in creating an annotation by automatically removing one or more annotation fields, modifying one or more annotation fields or adding one or more annotation fields.

It is yet another object of the invention to authorize any one of the use of an annotation form or the use of a field of an annotation form.

It is yet another object of the invention to receive a user determined document location, the user determined document location identifying a desired location within a target document. To then mark the desired location of the target document with an annotation widget.

It is another object of the invention to perform an annotation form operation by way of a GUI widget, a second runtime program or an extensible DHTML engine.

It is yet another object of the invention to select an annotation form by presenting a list annotation forms to a user, the user selecting one of the annotation forms as the annotation form.

It is an object of the invention to determine a list of annotation forms based on a runtime, user provided parameters, system provided parameters or authorization parameters.

It is yet another object of the invention to provide a runtime program comprising an application program interface for connecting an application program to the runtime.

It is yet another object of the invention to perform a function of selecting a document access module from a library of document access modules, the selection based on a document type of the target document, and accessing the target document by way of the selected document access module.

It is still another object of the invention to provide a target document to be annotated comprising any one of a text file, a word processor text file, an image bitmap, an image file, a video file, an audio file or a program file.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains preferred embodiments of the invention, together with advantages and features, by way of example with reference to the drawings.

DESCRIPTION OF THE PREFERRED EMBODIMENTS

Figure 1:
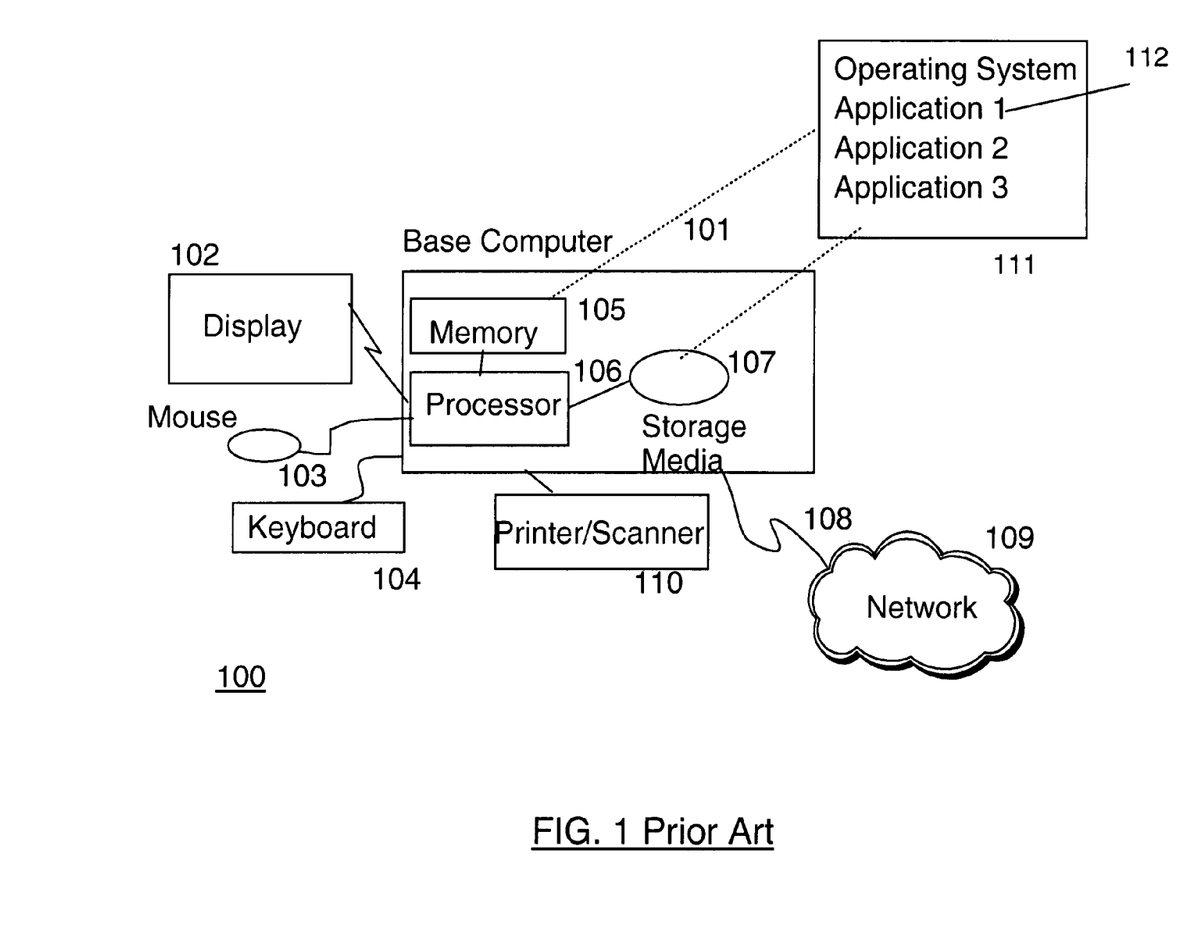
FIG. 1 is a diagram depicting prior art components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
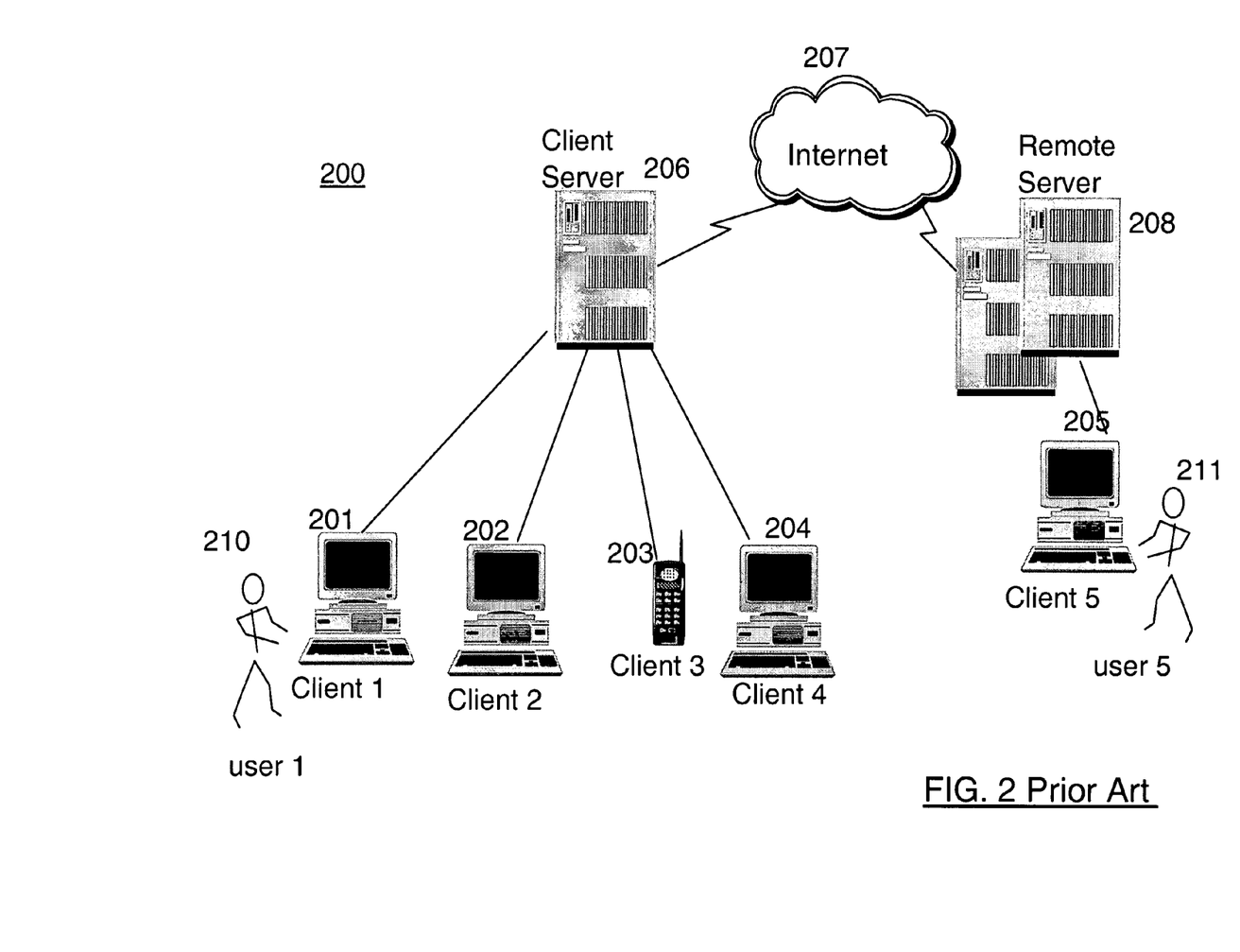
FIG. 2 is a diagram depicting a prior art network of computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In a preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

The present invention provides an annotation system for creating an electronic annotation of a document. The creation of the annotation is facilitated by a GUI form presented to the annotator in which the annotation forms filled out by users are backed by a runtime that can execute instructions with access to the target data being annotated and external data and processes. Thus, the present invention allows annotation forms to be automatically customized by the context and environment in which the annotation is created. The user is assisted in creating an annotation or performing an annotation associated task by the runtime code (preferably in the annotation form itself) which can perform functions such as automatically filling in fields in the annotation based on other annotation fields, the target data being annotated, or other contextual and environmental factors. The form can also assist and guide the user in creating the annotation by removing or adding fields it determines appropriate.

Using the present invention, the user can perform more than just data entry when filling in annotations. He can perform data analysis aided by the computer. In essence, since the annotation form can have advanced logic running in its runtime, the user can accomplish his task as part of creating an annotation. This alleviates the feeling of users that annotations provide no immediate value to the annotator. The present invention allows the act of creating an annotation to become the tool with which tasks are accomplished. In an example environment, a researcher has the job of analyzing images of brain tumors as they grow. With a traditional annotation system, this user would open an image and use an analysis program to run algorithms on the image. The user would then record the results of the analysis by creating an annotation on the image. With the present invention, this user would be able to run the analysis as part of the annotation itself. When the user wanted to create an annotation on the image, an example embodiment of our system would detect the context, including the user's identification and the target image and determine, as configured, that this user likely wants to perform a predetermined analysis on the target image. So the annotation form runtime would invoke the external analysis algorithms and store the results as part of the annotation automatically. The user can then add their subjective analysis to the annotation and submit it.

It should be understood that the image of the example could be any object including Bitmap, JPEG, GIF, MPEG, Text, Markup Language or PDF and will be referred to in the present specification as image or document interchangeably. Furthermore the document or image may actually be made up of several component documents or images and still be referred to as a document or image.

With the present invention, the annotation immediately provides a means to more efficiently achieving the user's task. Also, all of the benefits of the annotation paradigm now apply to that data, such as the query-ability and the ease of discovery and collaboration. Without using an annotation system, the user is left to more inconvenient means of storing results such as simple files on their systems which then are difficult to find and query or custom database and data entry applications which are expensive to develop and maintain and do not have the simple discoverability and ease of integration that the annotation paradigm brings.

Figure 3:
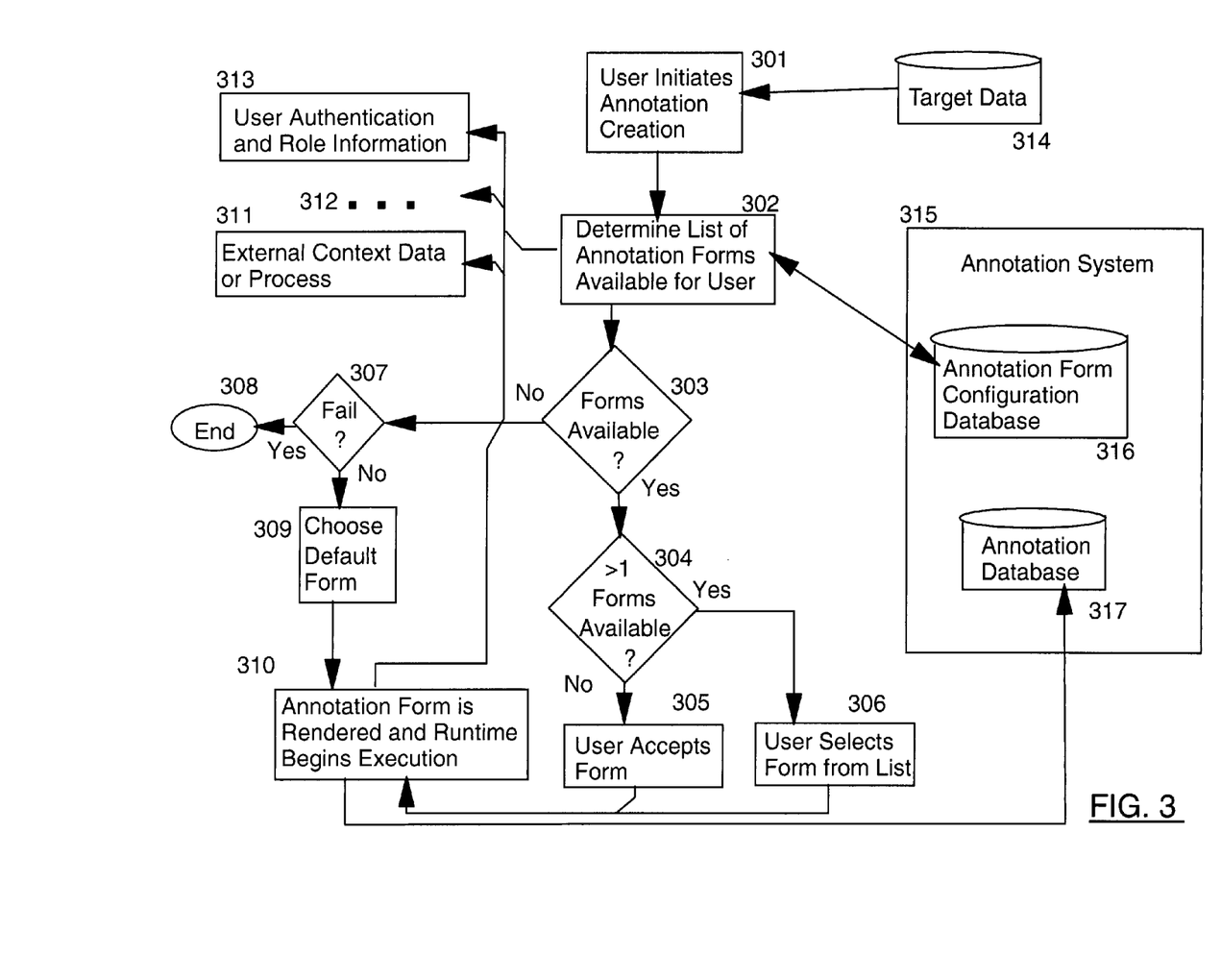
FIG. 3 is a Flow diagram depicting accessing an annotation form.

FIG. 3 illustrates example steps taken by the system when a user creates an annotation. The time flows from top to bottom. First the user views the target document 314 and while doing so initiates annotation creation 301, perhaps by clicking on a 'Create Annotation' button. Preferably, a location of the document is marked with an annotation widget relating the nature of the annotation to information of a specific location of the target document. Later, another user can see the widget on the document and in an embodiment, click on it to bring up annotation(s) associated with the document as marked by the widget. This instructs the system to pick the form to present to the user. To pick the form, the form choosing component retrieves the list of available form configurations 302 from the configuration database in the annotation system 315. The system can filter and prioritize the list of forms returned from the configuration database using context and external information such as the user's authentication information 313 or information such as the filename and type of the target document 311, among other external data 312. So the list of available forms is such an example would be reduced by the authentication information possibly by checking if a user has access to a particular form. Context sensitive annotation form selection is one important step for the guided data collection system. Once the final list of forms is reduced, there may still be more than one form 303. In which case 304, the user is presented with a choice of forms 306 to use for the annotation being created. If there is only one form 304, that form is automatically selected 305. If there are zero forms available 303, the user is notified and the annotation creation halted 308 or a very general default form is selected 309, the guided data collection system can be configured to do either.

After the form is selected, it is rendered 310 for the user and the runtime begins to execute the instructions included with the form 310. The runtime monitors the user interaction with the form and presents the interactions as events to the code in the runtime. The runtime exposes the data inside the document as well as gives access to external data to the instructions in the form. Once the user submits the annotation, the collected data is placed into the annotation system's annotation database 306.

Figure 4:
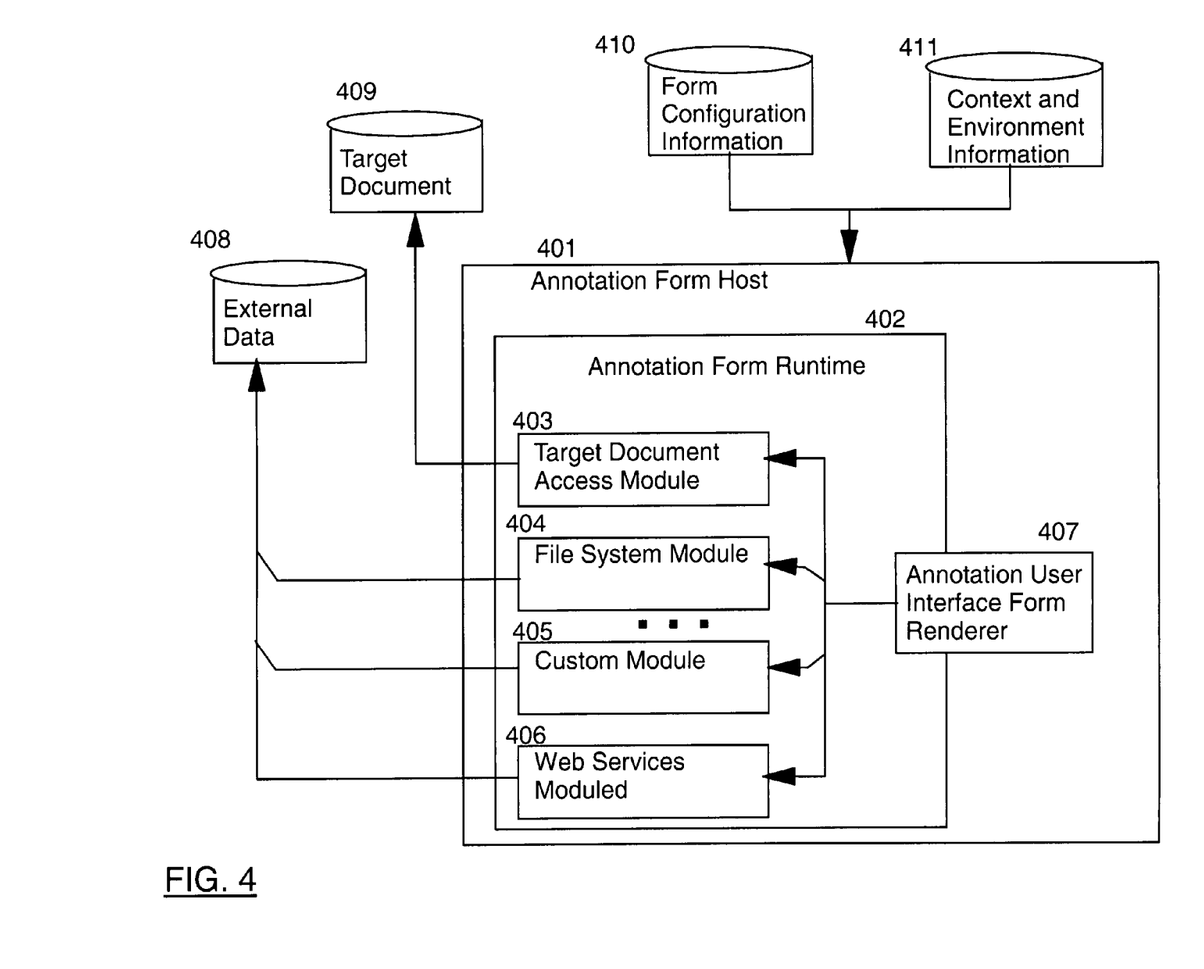
FIG. 4 is a diagram depicting example elements of the present invention.

FIG. 4 gives a more detailed look at example step of rendering the form 310 for the user and the runtime executing the instructions in the form. The interaction between the form and the runtime is the key component that allows for the form to guide the user in filling the form. The rendering and runtime component is known as the Annotation Form Host 401 or FormHost for short. The FormHost 401 reads as input both form configuration information 410 and information about the environment 411 in which the FormHost 401 is running. The form configuration information 410 includes information such as what fields need to be filled into the form, who can fill in that information (authorization), what type of data is required in each field or group of fields, what buttons should appear on the form, what actions to perform upon buttons being clicked or other such events for example. In fact, the form configuration may consist of multiple documents. For example, the data field, group, and type information may come from an XML Schema or a relational database schema or a custom document. The presentation information such as placement on the screen, buttons, colors, and processing instructions may come in a separate document such as an XSL document. In a preferred embodiment, the XSL document is applied to the XML Schema to create a final document in DHTML format to be displayed and executed by the FormHost 401. Once the FormHost 401 has read in and parsed the configuration information 410, it displays it using the Annotation User Interface Form Renderer sub-component 407. The FormHost 401 then begins the runtime execution 402 after loading in any required modules that the form configuration requires 403 404 405 406. For example, FIG. 4 shows a File System Module 404 and a Web Services Module 406 being loaded into the runtime. These modules would allow the form's instructions to read and write to the file system and to contact web services in response to the user's actions. The runtime exposes these modules in the form of Application Programming Interfaces (APIs) to the form instructions. The runtime 402 translates user interactions such as mouse clicks and keyboard key presses into appropriate events exposed to the form instructions. The form instructions perform work in response to events and can access external data via the modules, including a runtime module 403 to access the target document itself and its environment. The form is also free to access the data being entered into the form by the user. As such the form instructions can take action based upon the data entered such as pre-filling in other fields or hiding and showing fields as appropriate. Using this technique, a multi-step context sensitive data collection user interface can be created. Often such interfaces are known as 'wizards' or 'druids'.

In a preferred embodiment for the invention, the annotation server is created according to the pending U.S. patent application Ser. No. 10/600,014, entitled "Universal Annotation Management System" Filed Jun. 20, 2003 and assigned to IBM. Such a system provides many advantages and is flexible in its ability to annotate many heterogeneous types of target data. Other embodiments (where the annotation system stores the annotations within the data stream of the target object for example) are also possible using the techniques of the present invention.

In a preferred embodiment, the annotation system is structured such that an annotation server contains configuration information 410 for the annotation forms. This configuration information 410 is stored as a document in the eXtensible Markup Language format in such a manner as to describe a recursive tree structure consisting of fields and groups. Groups may contain a list of fields and/or other groups. Each group has a name and information about how many times the group must appear in an annotation conforming to the form and also the maximum number of times the group may appear in an annotation instance conforming to the form. Each field contains a unique name, a human readable label, and type information describing the data allowed inside that field. Fields also may contain other data such as the minimum and maximum number of times the field may appear and other arbitrary information known as 'facets' which supply hints to the FormHost 401 to provide better rendering. For example, a field may be specified as a 'multi-line' field by a facet. Upon seeing the 'multi-line' facet, the field would be rendered as a larger text entry area in the user interface. The FormHost 401 may ignore the facets in one embodiment.

In a preferred embodiment the XML document above describes the 'structure' or schema for an annotation. A second document is also supplied in a preferred embodiment. This second document is supplied in the form of an XML Stylesheet Language document. This document includes information that describes how to transform a structure document as described above with the fields and recursive groups, into a document more easily consumed by the FormHost 401 and its runtime 402. In a preferred embodiment, the XSL document contains information allowing it to generate Dynamic HyperText Markup Language documents (DHTML). Dynamic HTML is HTML that includes JavaScript or other such languages as part of the document. The embedded JavaScript can manipulate the HTML elements at runtime based on the Document Object Model (DOM) API that is exposed by the DHTML processor. As such DHTML processor includes a JavaScript runtime typically as a component. In the preferred embodiment, the FormHost's runtime is created by extending an existing DHTML processor's JavaScript runtime. Such extensible runtimes include Microsoft Internet Explorer's JScript runtime and the Mozilla SpiderMonkey JavaScript runtime together with the Mozilla Gecko HTML Rendering engine. In another embodiment, the XSL could be designed to produce documents in the XForms language rather than DHTML and the FromHost may extend an XForms processor to display the forms. DHTML is described in a document "Introduction to Dynamic DHTML" from MIROSOFT CORP. on the World Wide Web at msdn.microsoft.com/library/default.asp?url=/workshop/author/perf/perftips.asp.

In a preferred embodiment, the FormHost 401 extends an existing DHTML rendering and runtime engine by using the existing runtime's extensibility API to expose new modules to the JavaScript running with the runtime. These new modules include functionality such as described in FIG. 4. The 'Target Document Access' module 403 is an important special case module that exposes the key functionality that allows for context sensitive guided annotation forms to be implemented. The Target Document Access module may be implemented by using an existing application's automation API to access or communicate with the target document. For example, the ADOBE ACROBAT software from ADOBE Corp. provides as API for reading and writing information to and from Portable Document Format (PDF) files. The Target Document Access module 403 for PDF files may be implemented by using the Adobe Acrobat API to provide the JavaScript runtime access to the data in the PDF document. A similar approach is done for documents such as MICROSOFT WORD and MICROSOFT EXCEL from MICROSOFT CORP. documents or even relational databases. For relational databases, an appropriate database connection that exposes access to the database via the Structured Query Language (SQL) can be used by the Target Document Access module 403 to provide the JavaScript engine with access in the case of the target 'document' being a relational database. A different Target Document Access module 403 is loaded based on the type of target data so that the FormHost 401 can supply appropriate access to the target document 409. In a preferred embodiment, the FormHost 402 exposes the type of the target data 409 to the form it is hosting so that the form may take appropriate action based upon the type of document 409 being annotated.

Once the user initiates the submission of the annotation, the FormHost 401 reads the data from the DHTML runtime and rendering component 407 and formats the data into an annotation instance for transmission into the annotation system 408. This read-back of the data may be achieved by traversing the DHTML DOM looking for elements marked appropriately with identifiers describing which field and group the element represents in the annotation. Another methodology for extracting the data is to submit the form to a web server that may be external or local to the FormHost 401 such that the DHTML engine formats the data as name value pairs in form-encoded standard fashion. The web server can then format the data and send it to the annotation system. The approach depends on the extent of the access the DHTML engine gives the FormHost to the DHTML DOM.

The following example scenario will demonstrate the user interaction and the implementation of a preferred embodiment of the invention. The realization of the invention based on this description will be evident to one skilled in the art.

Table 1 is an example COM component that will be exposed via a JavaScript interpreter. Table 2 is an example form that might be returned by the server and rendered by the FormHost. The form includes JavaScript code that accesses both external systems and contextual data of the document being annotated.

Research in the life sciences makes use of visualization and image analysis. A hypothetical example of a common research method involves the researcher using physical methods, i.e. test tubes and Petri dishes to recreate and observe a biological phenomenon. At regular intervals, the researcher places the physical experiment under a microscope and photographs relevant objects. Once the experiment is complete, the analysis begins. The analysis consists of systematically running image processing algorithms on photographs that have been collected throughout the experiment. Those algorithms allow the researcher to extract qualitative data from the images for use in his analysis. For example, imagine the hypothetical experiment where a researcher is hoping to analyze the growth rate, or cell-doubling time, of a brain cancer tumor. A small microscopic tumor is physically placed in a suspension with a known food source placed in the same suspension at a known distance from the tumor. The tumor is then expected to grow and migrate towards that food source. This experiment would very roughly attempt to simulate a brain tumor as it grows toward blood vessels in the brain. At regular intervals, the researcher photographs the tumor under a microscope, thus recording the process of its growth. Once the researcher's physical experiment is complete, he analyses each photograph with an image processing software application. The researcher runs algorithms upon the image to remove noise, to enhance relevant artifacts, and to algorithmically derive the volume of the brain tumor. In the traditional situation, without the present invention, the researcher invokes the image processing application as a standalone software application. He loads each image and applies the processing, resulting in a value and possibly modified images. He then uses pen and paper to record the results in his notebook and also records his results electronically preferably using a spreadsheet application such as EXCEL from Microsoft Corp. In the end, the researcher is left with multiple image files, Excel files and lab notebook entries which are all scattered in the user's file system. Such isolated files make it nearly impossible to leverage the experiment in the future, especially by other researchers. For instance, it would be difficult for the researcher to later answer the question, "which type of food source in all of my experiments yielded the faster cell-migration rate?" Doing so would involve opening every file for every experiment and looking at the resulting migration rate. A much better solution would be to develop a custom application to gather the results and data into a database. Then the data would be query-able in many ways and becomes much more valuable in the long term. However, creating such an application is difficult, involving knowledge of relational databases and application programming. It is not practical to create such an application unless the productivity earned from it justifies the cost of creating the application.

A much better solution is to use an annotation system. Just by creating an annotation form, and filling out the results in the annotation system, the data is easily query-able. Still, however, this solution is not optimal as such a simple annotation system will place a significant burden on the user to enter multitudes of information such that the database is complete enough to be valuable. The best solution is to add some extra logic to the annotation form such that the image analysis is done automatically by the form. This eliminates many steps that the user has to perform and it allows the form to automatically fill in most of the data and include the actual documents and results being generated. Upon submission all of the information will be in a relational database or other such query-able store.

Figure 5:
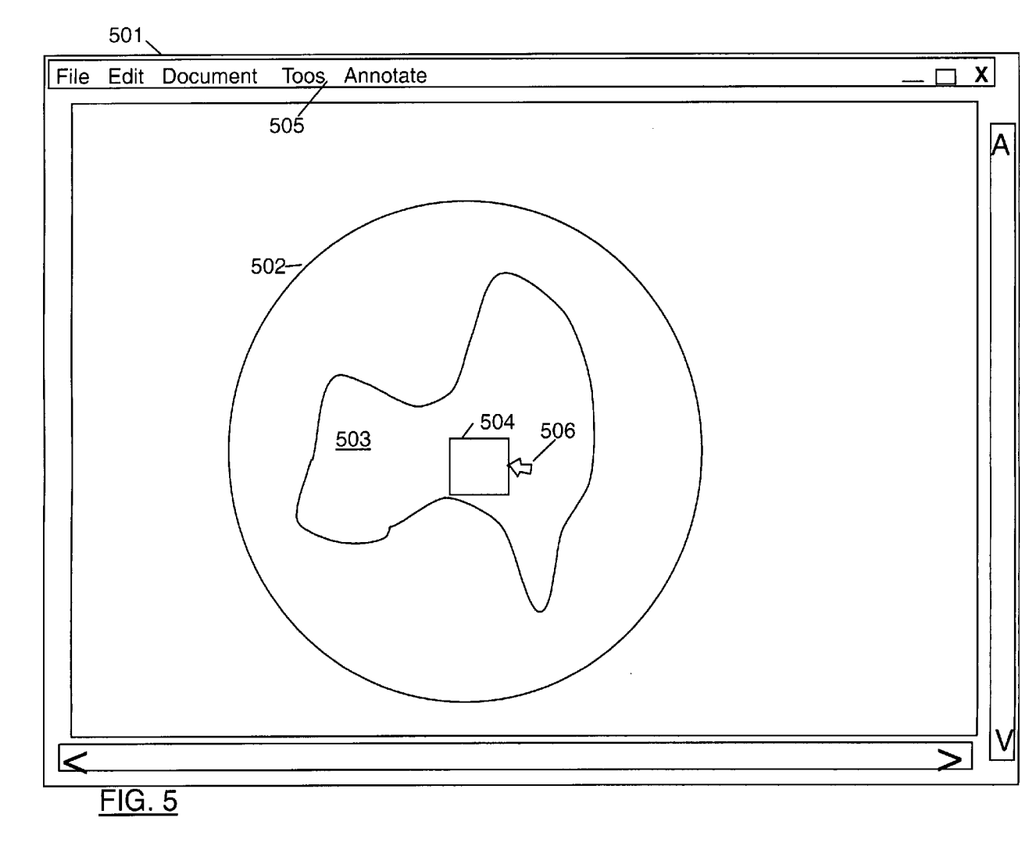
FIG. 5 is an example image to be annotated.

FIG. 5 depicts an example document to be annotated. The document in this example is a bitmap file displayed in a GUI window 501 containing a bitmap image 502 of the tumor 503 to be investigated. In a preferred embodiment, an annotation widget 504 is attached to a location within the image 502.

A user accesses a tumor image 501 in an annotation application. The tumor image is preferably one of a plurality of images of the same tumor captured at different times. For example, 32 images of a tumor are saved in a database and image #13 is the one selected 502 for display 501 in FIG. 5.

Figure 6:
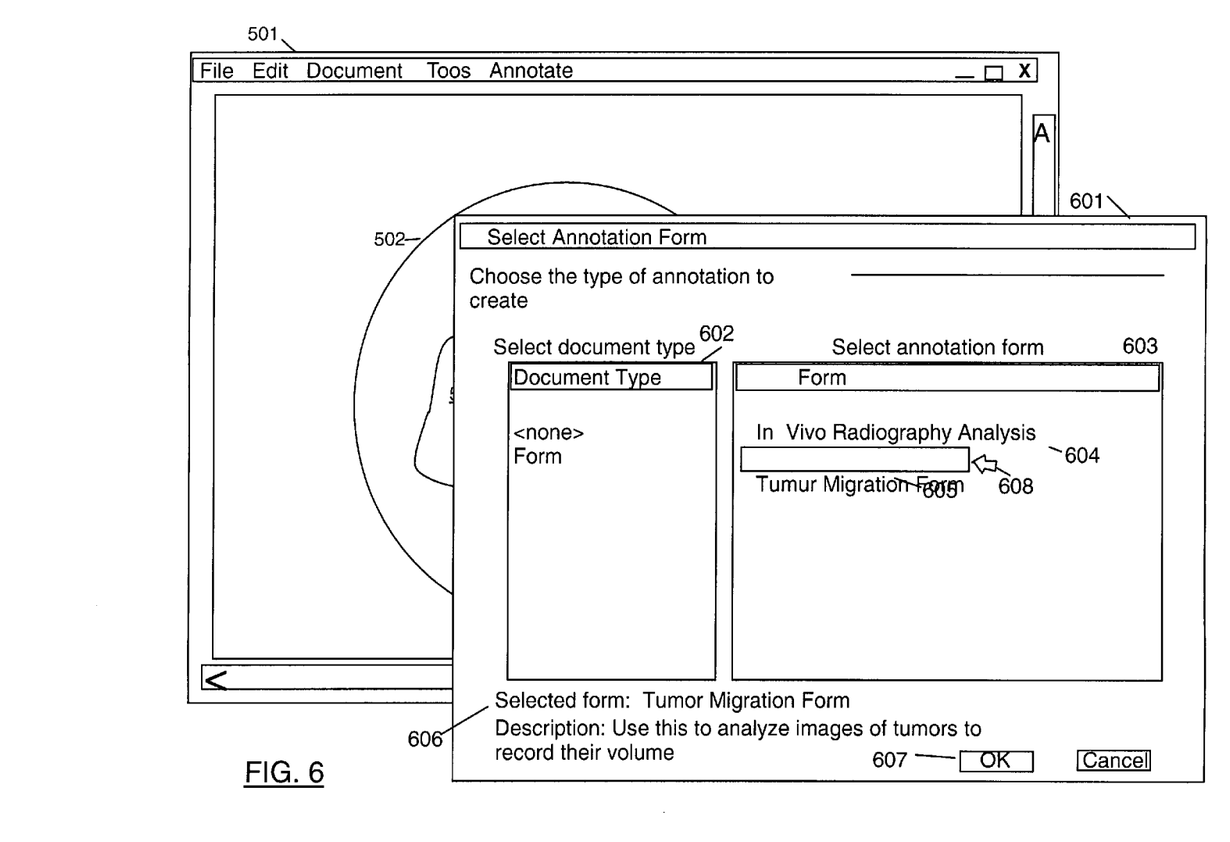
FIG. 6 depicts an example GUI window for selecting an annotation form.

The user wishing to Annotate this image 502, preferably moves his cursor to an area to be annotated and creates a widget 504 at that position or moves his cursor to an existing widget 504 and selects that widget or selects the Annotate widget 505 on the toolbar of the window 501. The action on the image window 501 causes an annotation selection form 601 to be displayed. Preferably the Annotation Form Selection window 601 comprises a list of document types 602 and a list of existing annotation forms 603. By moving a cursor 608 in the Form window, the user can select a Form 608. In the example, the user has selected "Tumor Migration Form" 605 rather than "In Vivo Radiography Analysis Form" 604. The selected form name 605 is preferably highlighted. The form selection window 601 in a preferred embodiment provides additional functionality 606 to assist the user in selecting the most appropriate form. Once the form is selected the selected form is invoked by selecting a radio button 607 or other means known in the art.

The selection of a form causes a predefined runtime application to be executed.

Figure 7:
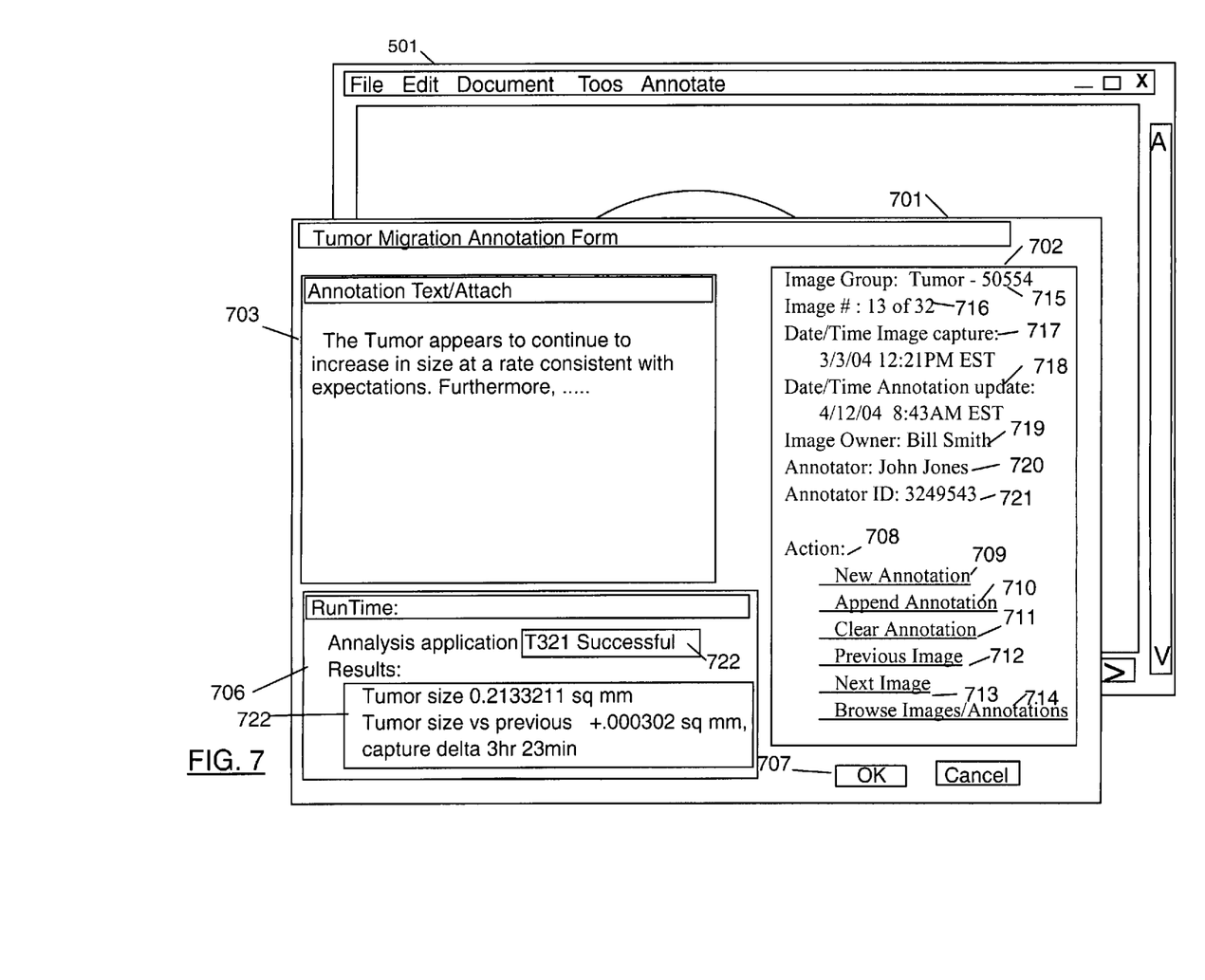
FIG. 7 depicts an example GUI annotation form.
Figure 8:
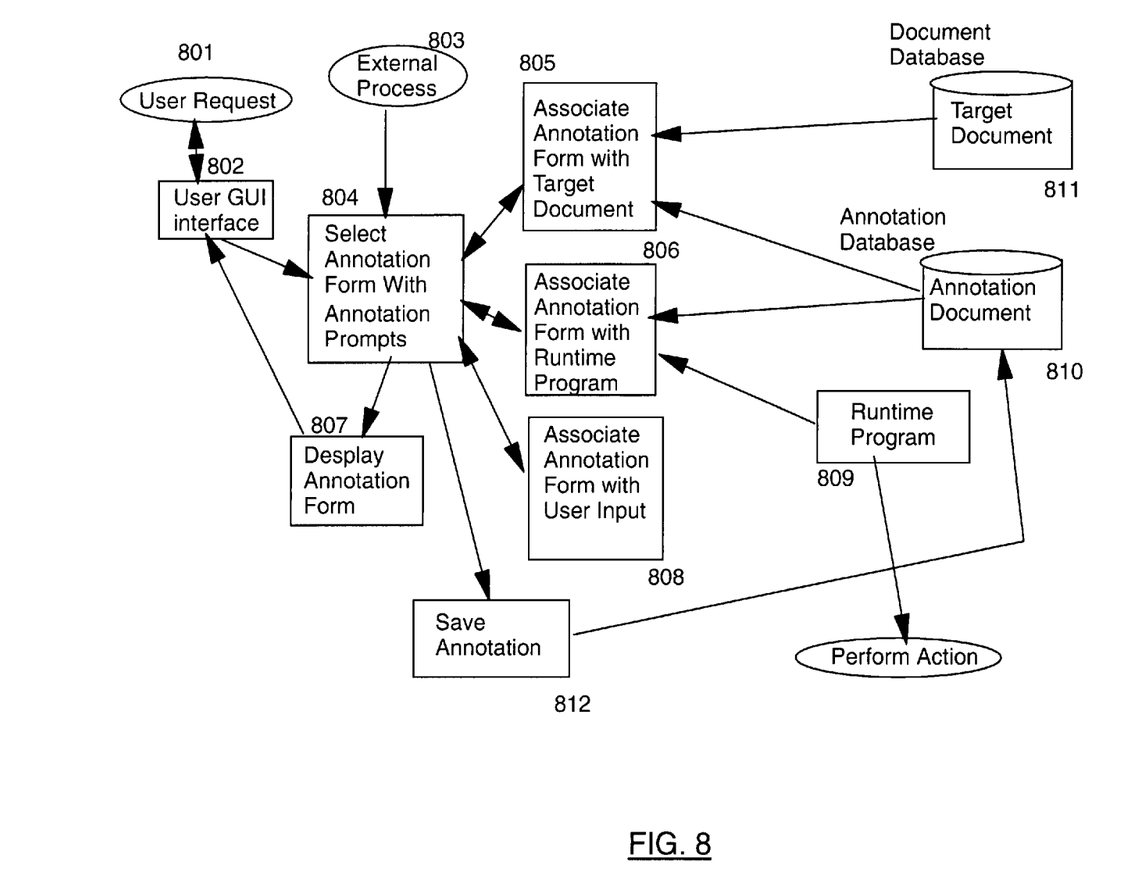
FIG. 8 is an example flow of the present invention.

In one embodiment, the runtime analyzes the image 502 associated with the annotation in progress. In one embodiment the runtime fills out portions of the form by accessing user information, image information or the like. In the example form 701, RunTime results are shown. The runtime application has analyzed the image and reports 706 in the window 701 that the associated application "T321" ran successfully 722. Furthermore, results comprising the size of the Tumor and the size change vs. the previous image as well as when the previous image was captured is displayed 722.

In an embodiment, information is automatically provided to the form fields by the RunTime application. The information comprises Image Group number 715, Image number 716, Date image was capture 717, date Annotation last updated 718, name of image owner 719, name 720 of current annotating user and an ID 721 of the current annotating user.

In an embodiment, the form provides Action buttons 708 to enable the user to perform useful functions such as navigation of annotations and images. In the embodiment, action buttons comprise New Annotation 709 for creating a new annotation, Append annotation 710 for adding annotation to an existing annotation, clear annotation 711 for removing annotations, previous image 712 and next image 713 for navigating from image to image. The action 708 may furthermore provide a radio button 714 to enable the user to directly browse images or annotations.

In an embodiment, the user can navigate to another image 716 to enable the RunTime to capture information and then return to the present image 502 such that the RunTime can compare the two images to assist the user in creating his annotation relative to other images of the group 715.

The annotation form provides a text area 703 for applying annotation information to the annotation. The annotation information may be text or any form of attachment including text, word processor text, video, audio or links to information (such as a link to a World Wide Web Page.

Once the user has created his annotation, he saves it to the annotation database by selecting the OK radio button 707.

Unlike the multiple steps performed in multiple standalone, unrelated applications in the traditional methodology described above, the present invention allows for the experiment analysis to be performed in a simpler more automated fashion and result in the data stored in a more productive storage system such as a relational database. The steps that a user might perform using the present invention to do the analysis are as follows:

First, referring to FIG. 5, the user opens an image 502 (preferably a bitmap, GIF, MPEG rendering of a photograph) of the brain tumor 503 in an annotation-enabled image viewer 501. The user then presses the 'Annotate' radio button and is subsequently presented with a choice (preferably, via a GUI window 601 as depicted in FIG. 6) of one or more annotation forms 604 605 to use for his annotation. To arrive at this list, the application has queried the annotation server for the list of forms that apply for annotating images by this particular user. The query employs the current application context and environment as parameters to this query. In an example embodiment, context elements include the user's name (username) and access credentials, the application in which the annotation is being made, the filename and file type or the annotated document, the operating system of the user, etc. The annotation server may use other external data by appending the query with parameters obtained by other systems. For example, the server might look in a corporate project assignment database to find annotation forms relevant for the user's current project assignment. The server returns as the result to the query, a list of annotation structures or annotation schemas. The client may yet further use other criteria to further narrow the list of annotation structures presented as a choice to the user. If there is only one annotation structure left after all of the filtering, then that structure's annotation form is immediately presented for entry. Otherwise, the user is presented with a list 603 to make the final selection. The user chooses the most appropriate form 605 based on the descriptions provided. At this point, the annotation client retrieves the annotation form (referring to FIG. 7, 701) that applies to the selected structure for rendering. The form 701 in this example embodiment is retrieved as a Dynamic HyperText Markup Language (DHTML) document. This document is renderable with a World Wide Web browser such as Microsoft Internet explorer from Microsoft Corporation.

To render the document 701, the annotation client first invokes an embedded copy of the web browser with its included JavaScript language interpreter. Microsoft Internet Explorer provides a Component Object Model (COM) framework by which it can be embedded and controlled by applications. Thus, using the browser as a rendering engine and JavaScript execution engine. Once the browser and JavaScript runtime are invoked, the JavaScript runtime is initialized with multiple modules to provide the advanced context access of the invention. The JavaScript engine has to be enhanced with modules to allow the code executing within it to access the document being annotated and external data sources such as web services or other databases. Normally the JavaScript engine does not supply such APIs to the code running within it. The Microsoft Internet Explorer JavaScript engine, however, is extensible and can be enhanced when being embedded. So in this embodiment, multiple modules in the form of automation-compatible COM objects are created to enhance the functionality available to the JavaScript code running in the engine. Those COM components are registered with the JavaScript engine via a well-known public interface for that purpose.

For example, assume that one wants to enhance the JavaScript engine such that it exposes a set of image manipulation algorithms as needed for the example scenario described. We want JavaScript code to be able to call a function 'ThresholdImage' and 'CalculateTurmorVolume'. First a COM object would be created that exposes and implements those methods. The COM object would basically be an object that exposes a single interface with those methods. The example IDL (Interface Definition Language) for such an object is shown Table 1. When the JavaScript engine is being initialized, this image manipulation component is instantiated by the FormHost and the FormHost places calls functions on the JavaScript engine to register the object as a new API exposed to the JavaScript code within the engine. Once that is done, a DHTML document that includes JavaScript code (such as the example shown in Table 2) can execute the functions and thus manipulate images. Notice that DHTML provides methods to respond to user actions as events such as the button click being used to trigger the call to the CalculateTumorVolume function in Table 2. Specifically, the 'onlick' handler of the button calls the 'OnCalculateVolumeButtonClicked' function. This extensibility point of the embeddable web browser and JavaScript interpreter allows us to implement the client component example of the present invention by building a series of COM objects such as the image manipulation example and FormHost software component. The multiple COM objects expose APIs to allow forms to communicate with their context, the document being annotated, and external sources. The FormHost component is in charge of communication with the server and initialization of the embedded web browser and JavaScript engine.

Once the form is displayed 701 via the methodology described above, the user interacts with it, thus in one example, invoking the modules to communicate with the form's context and external data sources. The form's logic may even fill in fields automatically based on user actions using the framework described above. The user eventually completes filling in information and interacting with the form and then submits the form, typically by pressing a 'submit' radio button. At this point, the FormHost must extract the information from the form to send to the server as the full annotation data. The FormHost does this by traversing the object model of the web browser. The DHTML document that contains the form includes special markup that allows the FormHost to determine which data to extract and how to send it to the server. For example, in Table 2 the % 'aid' attributes are hints to the FormHost which tell it that the data of that element is part of the annotation and that the name of the relevant field in the annotation is the value of the 'aid' attribute. The FormHost extracts all of the relevant data and formats a web service request, typically in the form of an HTTP POST message with XML as the posted data, and sends that request to the server as an invocation of the server's annotation creation functionality. The server in turn stores that data in its database.

The example process described above can be done differently using alternate web browsers or rendering systems that are not DHTML-based at all. In an embodiment, the XForms standard could have been used to render, display and extract data from the forms. Also, other languages and runtimes may be used instead of JavaScript. Languages such as VBScript, Perl, Java, custom languages, or any others could have been used instead while maintaining the spirit of the invention. The idea of embedding the rendering component and extending its functionality is an elegant implementation strategy but not essential to the invention. The runtime and rendering component may have also been implemented from scratch as part of the FormHost, for example, according to the teaching of the present invention. The server in the present example returned the DHTML document containing the form and script directly. In another embodiment of the invention, the server would return instead the schema of the annotation and an Extensible Stylesheet Language (XSL) transformation document which may be applied to the annotation schema to yield a renderable form such as a DHTML document or XForms document. The script may be included as part of the schema, the XSL document, or another document altogether.

TABLE 1

(ImageManipulator): (FIG. 4x)

```
1  import "oaidl.idl";
2  import "ocidl.idl";
3  [object,
4    uuid(41FFB689-9449-4AB5-B76D-65C3014100C0)
5    dual,
6    helpstring("ITumorImageManipulator Interface"),
7    pointer_default(unique)]
8  interface ITumorImageManipulator: IDispatch
9  { [id(1)]HRESULT ThresholdImage(BSTR ImageInFile, BSTR
       *ImageOutFile);
10 [id(2)]HRESULT CalculateTumorVolume(BSTR ImageFileIn, long
       *pOutVolume); } ;
11   [uuid(747EF3D6-B3D0-4FB2-B960-06DBC5E47079),
12     version(1.0),]
13   library TUMORIMAGEMANIPULATORLib
14   {importlib("stdole32.t1b");
15   importlib("stdole2.t1b");
16   [ uuid(27F760EE-23B2-44C5-A62D-11F1AF50C789),
17     helpstring("TumorImageManipulator Class") ]
```

TABLE 1-continued (ImageManipulator): (FIG. 4x)

```
18   coclass TumorImageManipulator
19   { [default]interface ITtumorImageManipulator;};};
```

Table 2 is an example form that might be returned by the server and rendered by the FormHost. The form includes JavaScript code that access both external systems and contextual data of the document being annotated.

TABLE 2

(ExampleForm): (FIG. 5x)

```
<!DOCTYPE HTML PUBLIC "-//W3C//DTD HTML 4.0
Transitional//EN">
<html>
<head>
<title>Tumor Migration Form</title>
<script language="javascript">
function OnCalculateVolumeButtonClicked( )
{
    // Get the filename of the image being annotated
    var imageFile = Annotation.GetTargetDocumentPath( );
    // Call the TumorImageManipulator module to perform the
tumor volume calculation
    var volume =
TumorImageManipulator.CalculateTumorVolume (imageFile);
    // Insert the calculated tumor volume directly into the
annotation input field
    var VolumeField = document.getElementById("VolumeField");
    VolumeField.value = volume;
}
</script>
</head>
<body>
<form action="javascript:Annotation.submit( )">
    Title:<input type="text"
aid="TumorMigrationForm.TitleField" /><br/>
    Tumor Volume:<input type="text" id="VolumeField"
aid="TumorMigrationForm.TumorVolumeField" />
    <input type="button" value="Calculate Tumor Volume"
onclick="OnCalculateVolumeButtonClicked( )" />
    <p/>
    <input type=submit value="Submit" />
</form>
</body>
</html>
```

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While a preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer implemented method for annotating a displayable electronic document at a graphical user interface (GUI), the displayable electronic document comprising any one of a displayable image or text, the GUI comprising a GUI display, the method comprising the steps of:

responsive to a first GUI action, selecting the displayable electronic document to be annotated, the displayable electronic document to be annotated selected from displayable electronic documents stored in a displayable electronic document database; and displaying the displayable electronic image at the GUI display;

responsive to a second GUI action, selecting an annotation form from a plurality of annotation forms, the selection based on one or more predetermined parameters, the annotation form comprising one or more user prompts for annotation data; and displaying the selected annotation form at the GUI display, the displayed annotation form comprising one or more user prompts, the user prompts prompting a user for annotation data;

responsive to a third user GUI action comprising moving a cursor to a position within the displayed electronic image, selecting the position of the cursor within the displayed image independent of content of the displayable electronic document, creating information associating the annotation form with the selected position of the selected displayable electronic document to be annotated;

responsive to an event associated with the annotation form, performing by a computer program, an analytic action on the displayed electronic image by way of a first annotation runtime program, the analytic action analyzing characteristics of the displayed electronic image to produce an analytic result;

receiving user provided annotation data associated with one of the one or more of said displayed user prompts; and storing in an annotation database each of the received annotation data, the selected position within the selected displayable electronic document and the produced analytic result; and responsive to a user fourth GUI action subsequent to said storing the annotation data, the user fourth GUI action selecting said position within the selected displayable electronic document, performing the steps comprising:

finding in the annotation database, the annotation data; and displaying the found annotation data.

2. The method according to claim 1, wherein the event associated with the annotation form comprises a further step consisting of any one of:

receiving a GUI action initiator from the user;
displaying the annotation form;
performing the saving step; or
closing the annotation form.

3. The method according to claim 1, wherein the action performed consists of any one of providing results of an analysis of elements of the target displayable electronic document to the user or providing results from invoked services or invoking services exposed by an element, wherein the element consists of any one of an application, an operating system or network services.

4. The method according to claim 1, wherein the selecting the annotation form step comprises the further step of:

a second annotation runtime program automatically filling in a field of the annotation form based on data consisting of any one of:

results of a runtime task initiated by the selecting the annotation form step, content of other annotation fields of the annotation form or the displayable electronic document being annotated.

5. The method according to claim 1, wherein the displaying the annotation form comprises the further step of:

automatically presenting a GUI presentation consisting of any one of a multi-part form, a field, a widget, a user prompt or a color in the annotation form based on input information, the input information consisting of any one of results of a runtime task initiated by the selecting the annotation form step, content of other annotation fields or characteristics of the displayable electronic document being annotated.

6. The method according to claim 1, comprising the further step of:

guiding the user in providing the annotation data by guidance consisting of any one of removing one or more annotation fields from the annotation form to be displayed, modifying one or more annotation fields of the annotation form to be displayed or adding one or more annotation fields to the annotation form to be displayed.

7. The method according to claim 1, further comprising:

authorizing usage consisting of any one of authorizing the use of the annotation form or authorizing the use of a field of the annotation form.

8. The method according to claim 1, comprising the further steps of:

marking the position within the displayable electronic document to be annotated with an annotation GUI widget;

storing the annotation GUI widget and information for locating the annotation GUI widget at the position; and the user fourth GUI action comprising selecting said GUI widget displayed at said position of said selected displayable electronic document; and responsive to said selecting said GUI widget, displaying said annotation data.

9. The method according to claim 1, wherein the selecting the annotation form step is performed by an element consisting of any one of a GUI widget, a second runtime program or an extensible DHTML engine.

10. The method according to claim 1, wherein the selecting the annotation form comprises the further steps of:

presenting a list listing the group of one or more annotation forms of the plurality of annotation forms to the user, the list comprising an entry indicating the annotation form; and the second GUI action step comprising receiving a user selection of the entry indicating the annotation form.

11. The method according to claim 1, wherein the one or more predetermined parameters consists of one or more of user provided parameters, system provided parameters or authorization parameters.

12. The method according to claim 1, wherein the first annotation runtime program comprises an application program interface for connecting an application program to the first annotation program.

13. The method according to claim 1, comprising the further steps of:

selecting a displayable electronic document access module from a library of displayable electronic document access modules, the selection based on a displayable electronic document type of the displayable electronic document; and the displaying the displayable electronic document step comprising accessing the displayable electronic document to be annotated by way of the selected displayable electronic document access module.

14. The method according to claim 1, wherein the displayable image to be annotated consists of any one an bitmap file, a video file, an audio file, a JPEG file, a GIF file, an MPEG file or a PDF file.

15. A computer implemented graphical user interface (GUI) method for annotating a displayed image, the method comprising:
1) responsive to a GUI user selecting a position within the displayed image, performing a method comprising:
associating a widget with the selected position, the widget for displaying an annotation form associated with the widget;
displaying the annotation form associated with the widget, the displayed annotation form selected from a plurality of annotation forms based on predetermined criteria; and
running a run-time program, the run-time program analyzing characteristics of the displayed image to determine image characteristic information;
2) entering GUI user provided information into the annotation form;
3) responsive to a GUI user storing action, storing the widget, the selected position, the determined image characteristic information and the user provided information in an annotation database; and
4) responsive to a GUI user displaying the displayed image, performing the further steps of:
fetching the stored widget, the selected position, the determined image characteristic information and the user provided information from the annotation database; and
displaying the fetched widget at the selected position within the displayed image;
5) responsive to a GUI user selecting the displayed fetched widget, displaying the annotation form, the displayed annotation form overlaying at least a portion of the displayed image, the displayed annotation form comprising the determined image characteristic information and the user provided information.

16. The method according to claim 15, wherein the displayed image consists of any one of a displayed bitmap, a displayed JPEG file, a displayed GIF file, a displayed MPEG file or a displayed PDF file.

17. A computer program product for annotating a displayed image by way of graphical user interface (GUI), the computer program product comprising:
A storage medium readable by a processing circuit and storing instructions for execution by the processing circuit for performing a method comprising:
1) responsive to a GUI user selecting a position within the displayed image, performing a method comprising:
associating a widget with the selected position, the widget for displaying an annotation form associated with the widget;
displaying the annotation form associated with the widget, the displayed annotation form selected from a plurality of annotation forms based on predetermined criteria; and
running a run-time program, the run-time program analyzing characteristics of the displayed image to determine image characteristic information;
2) entering GUI user provided information into the annotation form;
3) responsive to a GUI user storing action, storing the widget, the selected position, the determined image characteristic information and the user provided information in an annotation database; and
4) responsive to a GUI user displaying the displayed image, performing the further steps of:
fetching the stored widget, the selected position, the determined image characteristic information and the user provided information from the annotation database; and
displaying the fetched widget at the selected position within the displayed image;
5) responsive to a GUI user selecting the displayed fetched widget, displaying the annotation form, the displayed annotation form overlaying at least a portion of the displayed image, the displayed annotation form comprising the determined image characteristic information and the user provided information.

18. The computer program product according to claim 17, wherein the displayed image consists of any one of a displayed bitmap, a displayed JPEG file, a displayed GIF file, a displayed MPEG file or a displayed PDF file.

19. A system for annotating a displayed image, the system comprising:
a network; and
a computer system in communication with the network, the computer system comprising a graphical user interface (GUI), wherein the computer system includes instructions to execute a method comprising:
1) responsive to a GUI user selecting a position within the displayed image, performing a method comprising:
associating a widget with the selected position, the widget for displaying an annotation form associated with the widget;
displaying the annotation form associated with the widget, the displayed annotation form selected from a plurality of annotation forms based on predetermined criteria; and
running a run-time program, the run-time program analyzing characteristics of the displayed image to determine image characteristic information;
2) entering GUI user provided information into the annotation form;
3) responsive to a GUI user storing action, storing the widget, the selected position, the determined image characteristic information and the user provided information in an annotation database; and
4) responsive to a GUI user displaying the displayed image, performing the further steps of:
fetching the stored widget, the selected position, the determined image characteristic information and the user provided information from the annotation database; and
displaying the fetched widget at the selected position within the displayed image;
5) responsive to a GUI user selecting the displayed fetched widget, displaying the annotation form, the displayed annotation form overlaying at least a portion of the displayed image, the displayed annotation form comprising the determined image characteristic information and the user provided information.

20. The system according to claim 19, wherein the displayed image consists of any one of a displayed bitmap, a displayed JPEG file, a displayed GIF file, a displayed MPEG file or a displayed PDF file.

* * * * *

UNITED STATES PATENT AND TRADEMARK OFFICE
CERTIFICATE OF CORRECTION

PATENT NO. : 7,636,883 B2 Page 1 of 1
APPLICATION NO. : 11/131535
DATED : December 22, 2009
INVENTOR(S) : Albornoz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Ninth Day of November, 2010

David J. Kappos
*Director of the United States Patent and Trademark Office*